United States Patent [19]
Monkelbaan et al.

[11] Patent Number: 5,318,732
[45] Date of Patent: Jun. 7, 1994

[54] CAPACITY-ENHANCED MULTIPLE DOWNCOMER FRACTIONATION TRAYS

[75] Inventors: Daniel R. Monkelbaan, Amherst; Robert J. Miller, Niagara Falls; Michael R. Resetarits, Depew, all of N.Y.

[73] Assignee: UOP, Des Plaines, Ill.

[21] Appl. No.: 998,162

[22] Filed: Dec. 29, 1992

[51] Int. Cl.⁵ .................................................. B01F 3/04
[52] U.S. Cl. .................................................. 261/114.1
[58] Field of Search ...................................... 261/114.1

[56] References Cited

U.S. PATENT DOCUMENTS

| | | | |
|---|---|---|---|
| 2,646,977 | 7/1953 | Kraft | 261/114 |
| 3,410,540 | 11/1964 | Bruckert | 261/113 |
| 3,647,192 | 3/1972 | DeGroot et al. | 261/114.1 |
| 3,887,665 | 6/1975 | Mix et al. | 261/114.1 |
| 4,297,329 | 10/1981 | Sigmund et al. | 261/114.1 |
| 4,328,177 | 5/1982 | Trager | 261/114 JP |
| 4,550,000 | 10/1985 | Bentham | 261/114.1 |
| 5,223,183 | 6/1993 | Monkelbaan | 261/114.1 |

FOREIGN PATENT DOCUMENTS

| | | | |
|---|---|---|---|
| 0967500 | 10/1982 | U.S.S.R. | 261/114.1 |
| 1416732 | 12/1975 | United Kingdom | 261/114.1 |

*Primary Examiner*—Tim Miles
*Attorney, Agent, or Firm*—Thomas K. McBride; John F. Spears, Jr.

[57] ABSTRACT

The capacity of multiple downcomer type fractionation trays is increased by providing imperforate calming decks (6) which extend across the tray deck (2) surface outward from the conventional downcomer inlet opening together with vertical inlet weirs (8) attached to the outer end of the calming decks (6). The inlet weirs (8) may function as "preweirs" used in addition to the conventional inlet weir formed by the upward extension of the downcomer sidewall (4).

6 Claims, 2 Drawing Sheets

CAPACITY-ENHANCED MULTIPLE DOWNCOMER FRACTIONATION TRAYS

FIELD OF THE INVENTION

The invention relates to the design and construction of vapor-liquid contacting apparatus. The invention therefore relates to, for example, apparatus used as fractionation trays within fractional distillation columns to perform separations of volatile chemical compounds. The invention may be used in a variety of other gas-liquid contacting operations such as acid gas scrubbing or absorption processes.

RELATED ART

Fractional distillation trays are widely employed in the hydrocarbon processing, chemical, and petrochemical industries. Accordingly, a large amount of research, development, and creative thinking has been devoted to providing improved fractional distillation trays. Fractionation tray development has therefore provided many variations in contacting area structure, downcomer design, and overall tray structure.

U.S. Pat. No. 3,410,540 issued to W. Bruckert is believed pertinent for its showing of the structure of a prior art multiple downcomer type tray employing the highly distinctive downcomer-tray deck design similar to that employed in the subject tray.

U.S. Pat. No. 4,328,177 issued to J. E. Trager illustrates a fractionation tray having a vapor-liquid contacting deck which rests upon imperforate supports 12, with an imperforate plate 13 covering the seam between the supports and the contacting deck.

U.S. Pat. No. 2,646,977 issued to W. W. Kraft illustrates in FIGS. 5 and 7 a downcomer having an inlet weir which is offset from the downcomer inlet or mouth defined by the downcomer sidewalls.

BRIEF SUMMARY OF THE INVENTION

The invention is an improvement in vapor-liquid contacting apparatus for use in fractional distillation. The subject invention modifies the downcomer inlet design of downcomers used in multiple downcomer-type trays, as opposed to the more widely used crossflow trays, through the provision of a calming or stilling deck to provide a higher capacity contacting device. It is believed the invention may be used with any form of multiple downcomer tray. The performance of one form of multiple downcomer trays, in which inclined liquid deflecting baffles connect vertically adjacent downcomers, is also enhanced by the provision of antipenetration weirs on the baffles.

The functionally different embodiments of the invention share the common structural features of having a unique downcomer inlet structure.

The trays may employ one or more downcomers. One embodiment of the invention, may be characterized as a fractionation tray useful in the separation of volatile chemical compounds, each tray having a generally circular circumference and comprising: (i) at least one centrally located, narrow, trough-shaped downcomer being formed by two parallel opposing side walls and two end walls which are shorter than the side walls, the side walls and end walls being oriented perpendicular to the plane of the tray, the downcomer having an open inlet and a lower liquid sealable outlet means, (ii) at least two elongated vapor-liquid contacting decks, with a vapor-liquid contacting deck being located adjacent each downcomer side wall such that the tray has at least one more vapor-liquid contacting deck than downcomer means; (iii) substantially planar and preferably imperforate calming plates extending toward the contacting decks, the calming plates being parallel to and adjacent the contacting decks; and, (iv) inlet weirs attached to the calming plates and extending away from the contacting decks, the inlet weirs being preferably parallel to the side walls of the downcomers.

DESCRIPTION OF PREFERRED EMBODIMENTS

Figure 1:
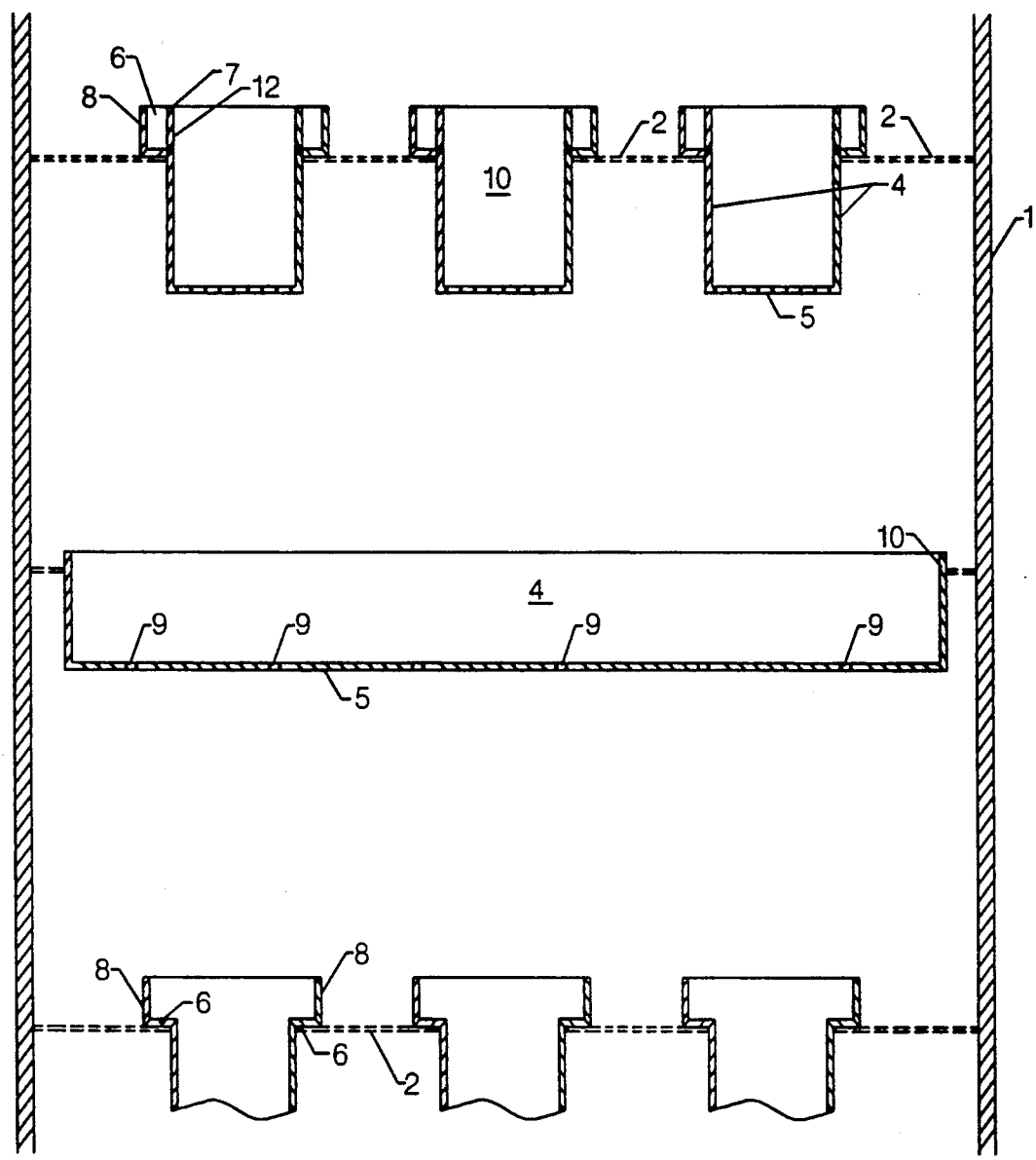
FIG. 1 is a sectional view looking across a portion of a fractionation column showing three trays each having three downcomers spaced across the tray, with the downcomer of the middle tray being viewed lengthwise.

Vapor-liquid contacting devices are used in a wide variety of applications for bringing into contact a liquid, which flows in a generally downward direction in the overall device, with a rising vapor stream. For instance, these devices are widely used to contact a gas stream with a treating liquid which selectively removes a product compound or an impurity from the gas stream. The subject apparatus can therefore be used in an acid gas absorber or stripper or in an ethylene oxide absorber. Another application of vapor-liquid contacting apparatus is in the separation of chemical compounds via fractional distillation. The apparatus of the subject invention can therefore be used in a variety of vapor-liquid contacting roles. The discussion herein is primarily in terms of use in a process for separation by fractional distillation, but this is not intended to in any way restrict the use of the invention to that mode of operation.

The subject apparatus can be used in the separation of essentially any chemical compound amenable to separation or purification by fractional distillation. Fractionation trays are widely used in the separation of specific hydrocarbons such as propane and propylene or benzene and toluene or in the separation of various hydrocarbon fractions such as LPG (liquified petroleum gas), naphtha or kerosene. The chemical compounds separated with the subject apparatus are not limited to hydrocarbons but may include any compound having sufficient volatility and temperature stability to be separated by fractional distillation. Examples of these materials are acetic acid, water, acetone, acetylene, styrene acrylonitrile, butadiene, cresol, xylene, chlorobenzenes, ethylene, ethane, propane, propylene, xylenols, vinyl acetate, phenol, iso and normal butane, butylenes, pentanes, heptanes, hexanes, halogenated hydrocarbons, aldehydes, ethers such as MTBE and TAME, and alcohols including tertiary butyl alcohol and isopropyl alcohol.

Two determinants of the quality of a contacting tray are its efficiency for performing a separation and its capacity in terms of liquid or vapor traffic. It is an objective of the subject invention to increase the capacity of multiple-downcomer trays.

Before proceeding further with a description of the invention, it is useful to define and characterize the type of tray referred to herein as a "Multiple Downcomer" tray. A multiple downcomer tray is distinguished from the conventional crossflow tray by several structural characteristics. First, a multiple downcomer tray does not have a "receiving pan". This is the normally imperforated section located below an inlet downcomer opening. Reference is made to previously cited U.S. Pat. No. 4,582,569 to A. E. O. Jenkins which illustrates a receiving pan 8 in FIG. 1. A receiving pan is the imperforate area upon which the liquid descending through the downcomer impacts before passing onto the decking of the tray. Often the receiving pan is separated from the decking or "active" area of the tray by an inlet weir. Receiving pans are therefore normally located directly below the downcomer leading from the next above conventional fractionation tray.

The horizontal surface area of a multiple downcomer fractionation tray is basically divided into downcomer means and vapor-liquid contacting area normally referred to as decking. There are no imperforate areas allocated to receiving descending liquid from the tray located immediately above.

Another distinguishing feature of multiple downcomer type fractionation trays is the provision of a relatively large number of trough-like downcomer means across the tray. The subject trays can employ from one to seven or more downcomers. These downcomer means are spaced relatively close together compared to the customary crossflow fractionation trays as they are spread across the surface of the tray rather than being at the periphery of the tray. The distance between adjacent downcomers (measured between their sidewalls or weirs) of the same tray is normally between 0.3 and 1.0 meters and will often be less than 0.5 meter. This results in a multiple downcomer type tray having a unique design when viewed from above consisting of the alternating decking areas and downcomer means evenly spaced across the upper surface of the fractionation tray.

The "top to bottom" design of the downcomer means of multiple downcomer trays is also unique compared to the downcomers employed upon normal cross-flow fractionation trays. The downcomer means do not extend downward to the next fractionation tray. Rather they stop at an intermediate distance located between the two trays. The downcomer descending from the tray above therefore stops well above the deck surface and the inlet to the downcomers of the tray below. The top or inlet to the downcomer of a multiple downcomer tray functions as the outlet weir of the tray, and the bottom of the downcomer of a multiple downcomer tray above is therefore well above the top edge of the outlet weir of the tray located below.

When installed in a fractionation column, the downcomers on multiple downcomer trays have previously been oriented at 90 degrees from the downcomers on trays located immediately above and below. Liquid falls from openings in the bottom of the downcomers onto the contacting decks of the next lower tray. The openings are distributed to prevent liquid falling directly into a downcomer. The downcomers of each tray in the subject invention can, however, be aligned with the downcomers on the other trays of the column such that the downcomers on one tray are immediately below those on the tray above as disclosed in U.S. patent application Ser. No. 07/862,472 filed Apr. 2, 1992. In this arrangement, the outlets of one downcomer are directly above the inlet of another. The downcomers are arranged along a number of vertical planes which extend the axis of the column. The number of planes is equal to the number of downcomers on a tray.

When the trays have aligned downcomers, they also comprise a means to define vertical liquid flow paths between vertically adjacent trays comprising a pair of inclined downcomer baffles, with each baffle extending from one sidewall of each downcomer to an opposite sidewall of an aligned downcomer of a vertically adjacent tray, the downcomer baffles crossing over the open inlets of the downcomers, with each of two downcomer baffles being placed over different sections of each downcomer and with the two downcomer baffles of each downcomer being inclined to deliver liquid to different contacting decks. (When viewed from one end of the downcomer, the two baffles would appear to form an "X".) In this embodiment of the trays there is preferably provided a perforated antipenetration weir on the lower end of the downcomer baffles, with the weir being perpendicular to the downcomer baffle. This weir serves as a means to decrease the downward velocity of liquid descending across the surface of mesh packing or plate packing which serves to lessen the impact of the liquid on the tray below could also be used.

Yet another distinguishing feature of multiple downcomer type fractionation trays is the provision of a liquid sealable means in the bottom or outlet of the downcomer means. The bottom of the downcomer means is therefore partially closed off by a plate having various perforations or by some other means intended to retard the direct downward flow of liquid out of the downcomer means. This liquid sealable outlet is located well above the deck of the tray located immediately below and is at a level above the inlet of the downcomers associated with this next lower tray. The descending liquid is collected in the lower portion of the downcomer means and spills forth upon the next lower tray through these openings.

There is no inlet weir at the bottom of the downcomer of the subject multiple downcomer type trays as in a cross-flow tray. The liquid sealable outlet performs this function and, again, the bottom of the downcomer is well above the next tray.

Multiple downcomer trays are characterized by a very short liquid flow path between the point at which the liquid first falls on the tray and the point at which the liquid exits the tray via the downcomer means. This is due primarily to the close spacing of the downcomers as described above. With the distance between downcomer side walls of adjacent downcomers (the width of a decking section) being between 1 and 0.3 meters, the average liquid flow path is less than one meter. This short horizontal distance the liquid must travel coupled with the agitation attendant with the passage of vapor upward through the decking results in multiple downcomer trays having essentially no liquid level gradient from the liquid inlet to exit points.

The physical size of any portion of a multiple downcomer tray must be chosen by a skilled designer considering all aspects of the intended operation of the tray. The following are measurement ranges of commercially employed conventional multiple downcomer type trays which are presented for the dual purposes of providing guidance in the design and use of the subject apparatus and for distinguishing the multiple downcomer type trays of the subject invention from conventional crossflow fractionation trays. The spacing between vertically adjacent trays will normally be between 20 and 91 centimeters (8–36 inches) and is preferably between 25–61 centimeters (10–24 inches). The total open area of the deck area is generally in the range of about 5 to about 15 percent. This includes the open area provided by both circular openings and any elongated slots present in the decking area of the tray. The normal hole diameter of the circular perforations may range from about 0.3 to about 2.6 centimeters (⅛–1.0 inches). A hole size of about 0.47 to about 0.64 centimeters (3/16–¼ inch) is normally preferred. The open area provided by slots is preferably from about 0.25 to about 5 percent of the area of the deck. A representative thickness of the decking is about 0.19 centimeters (0.075 inches) to 0.34 cm.

The rectangular inlet openings of the downcomers of a multiple downcomer type tray are normally about 6 to about 25 cm wide (2.5–10 inches). The height of a downcomer as measured from the horizontal top edge of the sidewall to the bottom edge of the sidewall is normally between about 15.2 to about 45.7 centimeters (6–18 inches). This includes the height that the downcomer extends above the decking and below the decking. The central liquid/vapor baffle will normally be approximately equal in height to the associated downcomer means sidewall. The height of the liquid flow directing baffles (13) may range from about 10 to about 30 centimeters as surface of the baffle. Further information on the arrangement and variations of the elements of a multiple downcomer tray may be obtained by reference to U.S. Pat. No. 3,410,540 and previously cited U.S. patent application Ser. No. 07/862,472 which are incorporated herein by reference for this teaching.

The subject invention aims to provide a higher tray capacity through modification of the downcomer inlets. This modification may be applied to an existing tray or designed into new trays. It is believed that the subject invention can be applied to any type of multiple downcomer tray including the conventional flow path design or newer designs which provide the parallel liquid flow required for a Lewis Case 2 flow.

The two fundamental structural characteristics of the multiple downcomer trays of the subject invention are an inlet modified to include an imperforate calming or stilling deck and, preferably, a preweir located at the junction of the calming deck with the active (perforated) portion of the tray deck. The preweir may be the sole inlet weir to the downcomer or may be used in addition to the prior art weir formed by the upward extending downcomer sidewalls.

An embodiment of the invention incorporating these two fundamental features may be characterized as: A vapor-liquid contacting tray having a generally circular circumference and comprising: (i) at least one centrally located, narrow, trough-shaped downcomer, each downcomer being formed by two opposing side walls and two end walls which are shorter than the side walls, the side walls and end walls being oriented perpendicular to the plane of the tray, each downcomer having an open inlet and a liquid sealable outlet means, (ii) at least two elongated vapor-liquid contacting decks, with a vapor-liquid contacting deck being located adjacent each downcomer side wall such that the tray has at least one more vapor-liquid contacting deck than downcomer means; (iii) means to define vertical liquid flow paths for liquid flowing onto the tray from a vertically superior downcomer comprising two inclined downcomer baffles, with the downcomer baffles intersecting an upper edge of the side walls and preferably being separated from each other by a substantially imperforate seal plate, the downcomer baffles being substantially equal in length to one-half of the associated downcomer and crossing over the open inlets of each downcomer, with the two downcomer baffles of each downcomer being inclined to deliver liquid to different contacting decks; and, (iv) two substantially imperforate calming decks which extend between said open inlet and said contacting decks, the calming decks being rectangular plates at substantially the same level as the contacting decks, with the calming decks and contacting decks being separated by a preweir perpendicular to the plane of the tray.

Multiple downcomer trays which employ vertically aligned downcomers as shown in U.S. patent application Ser. No. 07/862,472 also preferably include a vertical baffle perpendicular to the downcomers and to the tray deck to maintain separate fluid flow paths in column as needed to provide parallel flow.

A more complete understanding of the subject invention may be obtained by reference to the drawings. FIG. 1 shows a sectional view seen looking horizontally across a portion of a vertical column 1 containing three multiple downcomer trays located within the circular outer vessel. Each of the trays represented in this drawing have three downcomers and are customarily supported by an angle-iron ring, not shown, which is welded to the inner surface of the wall. Each rectangular downcomer is comprised of two downcomer end walls 10 and two preferably parallel downcomer side walls 4. The downcomers are uniformly spaced across the tray and terminate above the next tray. Located between the downcomers is the perforated vapor-liquid contacting decking or deck 2 portions of the tray. Perforated decking 2 is also present between the extrememost downcomer means and the outer periphery of the tray. That is, the portion of the tray enclosed between the end downcomers and the perimeter of tray is also filled with perforated decking and is an active vapor-liquid contacting area of the tray. There is no significantly sized imperforate area present in any of the decking portions of the tray to act as a liquid receiving pan.

FIG. 1 also shows the provision of stilling or calming decks 6 which are located between the preweirs 8 and the open inlets to the downcomers. For purposes of illustration, on the uppermost tray the downcomers comprise both the traditional inlet weir having a top edge 7 formed by the downcomer and the preweir 8 of the subject invention. On the lowermost tray the traditional weir has been deleted and only the preweir 8 is shown. (In practice, it is expected all downcomers in a column would be uniform in structure.) This figure illustrates the conventional alternating alignment of the downcomers, with the downcomers of the middle tray being perpendicular to those of the top and bottom trays.

Figure 2:
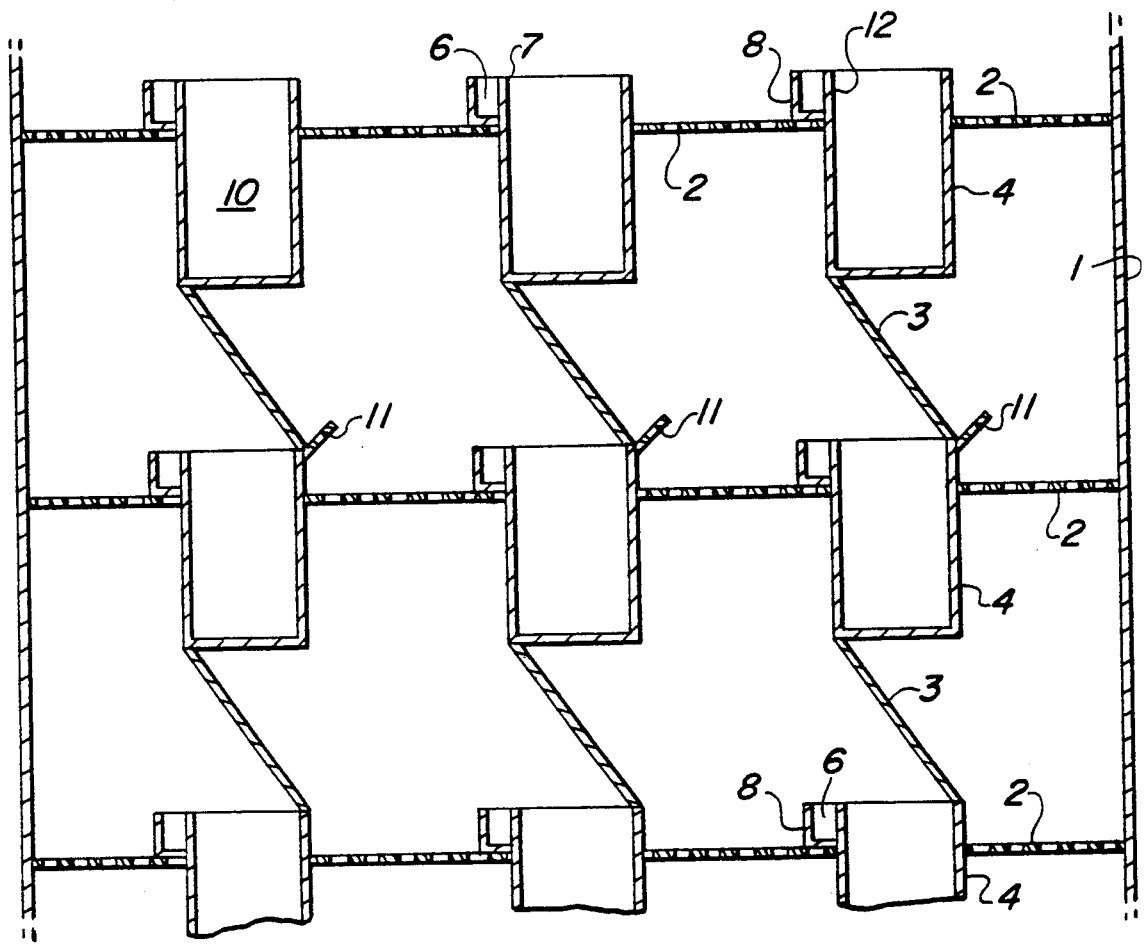
FIG. 2 is a sectional side view of an alternative embodiment of the trays of the invention showing the downcomer side walls 4, and the connecting downcomer baffles 3.

FIG. 2 illustrates the sectional view seen looking horizontally across a fractionation column employing recently introduced aligned downcomers (on vertically adjacent trays) and the inclined downcomer baffles 3 used to provide parallel flow. It may be seen that the downcomer baffles extend between the downcomers in such a manner that neither liquid nor vapor may travel horizontally over the downcomers from one decking surface to another. Liquid descending from one downcomer is prevented from falling into the next lower downcomer and must flow horizontally across the decking to the opposite end of the lower downcomer in order to proceed to the next lower tray. In this embodiment two sloped downcomer baffles cover the inlet of each downcomer. The baffles have "opposite" slopes which deliver liquid onto deck portions on different sides of the downcomer. In this embodiment the baffles 3 on one side of the tray all slope in the same direction, and the baffles on the other side (or other half) of the column face in the opposite direction. Liquid therefore flows in the opposite direction on the two sides of any one tray, but flows in the same direction (parallel flow) on all deck areas on one side of each tray.

In the alternative downcomer arrangement of FIG. 2, an optional antipenetration baffle 11 is mounted on baffle 3 and inclined upward to the extent that it may be perpendicular to baffle 3. This is intended to intercept liquid flowing down the top surface of the baffle 3 so that it does not impact directly on the decking 2. Penetration of the liquid through the tray is therefore minimized.

Figure 3:
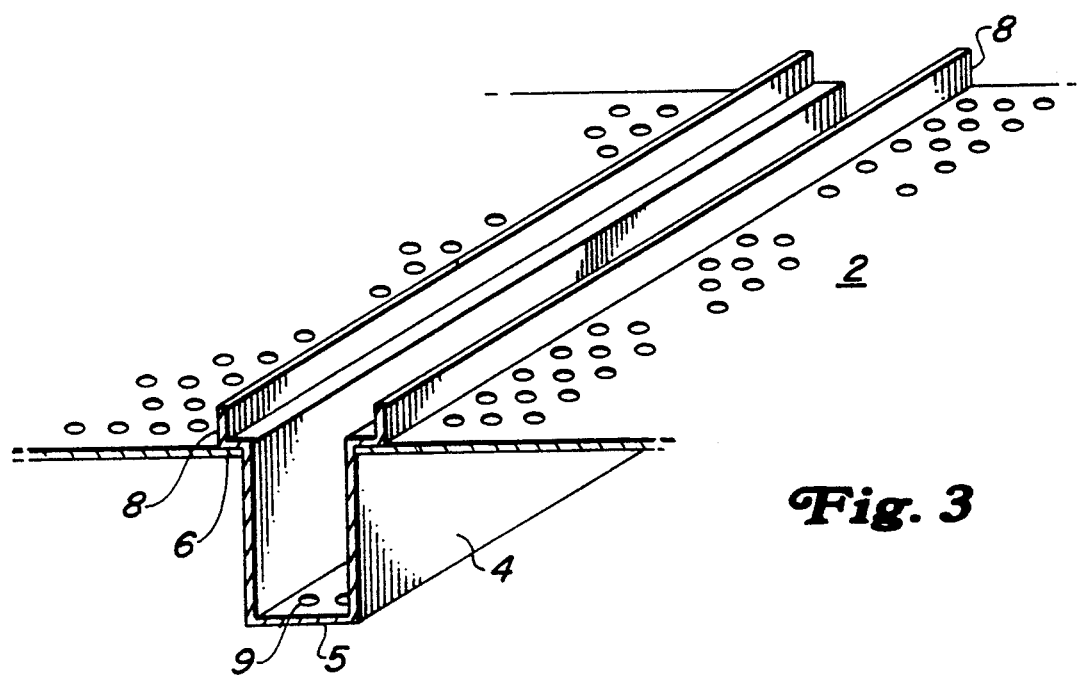
FIG. 3 is a isometric view seen looking across a portion of the column 1 shown in FIG. 1 illustrating one downcomer with the calming plates 6 and inlet weirs 8

FIG. 3 is an isometric sectional view looking in a substantially horizontal direction toward a portion of the lowermost fractionation tray shown in FIG. 1. The bottom of the downcomers is typically a flat horizontal bottom plate 5 extending between the side walls 4. A number of relatively large circular openings 9 are provided in the bottom plate for the purpose of allowing the rapid exit of the liquid which accumulates within the downcomer. The purpose of the bottom plate is to retard the liquid flow sufficiently that the bottom of the downcomer means is dynamically sealed by liquid to the upward passage of vapor. In the aligned downcomer embodiment the openings are distributed uniformly along the length of each downcomer. The openings may be circular, square or elongated in either direction, that is, along the width or length of the downcomer means. Circular openings and elongated grooves extending between the side walls 4, sometimes referred to as louvers, are preferred. The sealing of the downcomer outlet to upward liquid flow could be accomplished by other structures and does not form part of the subject invention.

One embodiment of the subject invention may accordingly be characterized as an apparatus for use as the vapor liquid contacting means present within the internal volume of a fractional distillation column comprising a plurality of similarly constructed fractionation trays in spaced relation and aligned above one another to define an inter tray volume located between each pair of adjacent trays, with each tray comprising at least two trough-shaped downcomer means which comprise two side walls and two end walls and extend into said inter tray volume on two sides of the tray, with the downcomer means of all of the trays being aligned in the same direction and located above one another, with the downcomer means having a rectangular inlet at open upper end with the inlet being separated from the two adjacent contacting decks by preferably rectangular imperforate stilling decks which terminate at a pre-weir located between the stilling deck and contacting deck; inclined liquid deflecting baffles extending through the intertray volumes from the outlet end of the downcomer means of each tray to the inlet end of the aligned downcomer of the tray immediately below, with the liquid deflecting baffles traversing the space above the inlet to the tray immediately below and sealing the inlet to liquid flowing downward from the outlet of the downcomer immediately above, with an antipenetration weir means being located near the base of the liquid deflecting baffle to decrease the velocity of liquid on the weir; and, means for separating the internal volume of the column into at least four symmetrical and segregated vapor flow paths extending from a lower end of the column to an upper end of the column, said means comprising a planar central baffle extending axially into the intertray volume between the first and second ends of the column.

A more inclusive embodiment of the invention is a fractionation column comprising an enclosed cylindrical outer vessel having a plurality of the subject trays mounted therein. The overall apparatus would include the customary accessories for feeding the liquid and vapor streams to be contacted and such other normally employed equipment as a reboiler and a reflux system.

It is preferred that the trays of the subject invention include a number of vapor-directing slots in the decking section of the fractionation trays in addition to the circular openings which allow upward vapor flow. The slots are oriented such that the gas rising upward through the deck through these slots imparts a horizontal thrust or momentum to the liquid or froth on the tray in the direction of the nearest downcomer means. This is especially preferred at the end of each side of the trays where the liquid must flow in a semicircular pattern around the central baffle. These slots and their function may resemble those described in U.S. Pat. No. 4,499,035 which is incorporated herein by reference. U.S. Pat. No. 3,417,975 issued to B. Williams et al. provides representations of a portion of decking material having both circular perforations and flow directing slots. This patent is also incorporated herein for its teaching as to the design and usage of flow directing slots.

The vapor rising upward through the slots leaves the slots at an angle to the tray surface having a definite horizontal component and imparts some of the horizontal momentum of the vapor to the liquid phase or suspended droplets above the deck surface. This results in a net force pushing the froth towards the outlet downcomer. There is therefore achieved a more rapid passage of the froth into the downcomer means and a decrease in the froth height on the tray. More importantly by proper slot arrangement there should be no zone on the tray having liquid which is not flowing toward an outlet.

The contacting decks will preferably comprise both standard symmetrical (circular) perforations which are uniformly distributed across the decking surface and the above mentioned vapor-directing slots. The precise alignment or spacing of the circular perforations is not believed to be a controlling variable in the subject invention. It is important, however, that a higher number of perforations per unit area be provided on any portion of a tray deck which receives liquid from more than one downcomer to maintain a uniform vapor to liquid flow ratio across the tray. The perforations are preferably spread in a relatively uniform manner across the entire contacting deck area. No attempt is normally made to align the slot openings with or to have the slot openings fall between the circular perforations.

The subject trays may comprise a plurality of beds of contacting material between vertically adjacent trays.

The packing material may be random "dumped" packing such as sold under several trademarks including Pall rings or a structured packing. Dumped packing may be rings, spheres, saddles, etc. Structured packing may be of the parallel plate or mesh type. These beds are preferably supported a short distance (2-15 cm) above the upper decking surface of the lowest tray and therefore free from contact with the contacting deck. The beds are present as layers located in the portion of the column which is occupied by froth when the column is in use. The bed layers cover substantially the entire active area or cross-section of the tray when viewed from above except for the area devoted to downcomers.

It is important to note these beds of packing are not a substitute for the trays, but instead are intended to increase the performance of the overall column. The apparatus is therefore a trayed column which contains packing in addition to the active fractionation trays. The addition of the packing does not significantly change the vertical spacing between trays.

In order for the packing to function effectively, liquid from the next higher tray must be spread across the packing beds to allow contact with vapor passing upward through the bed. Those skilled in fractionation tray design can easily develop a multitude of mechanical means to perform this. For instance, liquid can be collected from downcomers and spread over the packing through a grid of perforated pipes. Openings in the sides of the downcomers may be used to allow liquid to spill onto the packing. Alternatively, or in addition openings designed to allow downward liquid passage may be provided in the decking material to ensure the tray "weeps" liquid onto the packing. This means for passing descending liquid from the next above tray should pass from about 15-about 75, preferably 25-60 volume percent of the liquid over the packing. The rest flows through the downcomers. The amount of packing used on any one tray is preferably equal in volume to less than 50 percent of the available intertray volume between vertically adjacent trays. A minimum bed thickness of 10 cm is desired with beds up to about 30 or more cm thick being contemplated.

What is claimed:

1. A vapor-liquid contacting tray having a generally circular circumference and comprising;
   (i) at least one narrow, trough-shaped downcomer being formed by two parallel opposing side walls and two end walls which are shorter than the side walls, the side walls and end walls being oriented perpendicular to the major plane of the tray, the downcomer having an open inlet and a lower liquid sealable outlet means;
   (ii) at least two elongated vapor-liquid contacting decks, with a vapor-liquid contacting deck being located adjacent each downcomer side wall such that the tray has at least one more vapor-liquid contacting deck than downcomer means;
   (iii) substantially planar and imperforate calming plates extending from the downcomer toward the contacting decks, the calming plates being in substantially the same plane and adjacent the contacting decks;
   (iv) inlet weirs attached to the calming plates at the junction of the calming plates and the contacting decks and extending away from the contacting decks, the inlet weirs being substantially parallel to the side walls of the downcomers; and,
   (v) a second weir formed by the upward extension of the downcomer sidewall separating each calming plate from the downcomer inlet.

2. A vapor-liquid contacting tray having a generally circular circumference and comprising
   (i) at least one narrow, trough-shaped downcomer being formed by two parallel opposing side walls and two end walls which are shorter than the side walls, the side walls and end walls being oriented perpendicular to the major plane of the tray, the downcomer having an open inlet and a lower liquid sealable outlet means;
   (ii) at least two elongated vapor-liquid contacting decks, with a vapor-liquid contacting deck being located adjacent each downcomer side wall such that the tray has at least one more vapor-liquid contacting deck than downcomer means;
   (iii) substantially planar and imperforate calming plates extending from the downcomer toward the contacting decks, the calming plates being in substantially the same plane and adjacent the contacting decks;
   (iv) inlet weirs attached to the calming plates at the junction of the calming plates and the contacting decks and extending away from the contacting decks, the inlet weirs being substantially parallel to the side walls of the downcomers; and,
   (v) inclined liquid deflecting baffles covering the open inlet of the downcomer with an antipenetration weir substantially perpendicular to the baffle being attached to the upper surface of each baffle.

3. A trayed fractionation column useful in the separation of volatile chemical compounds and comprising:
   a.) a cylindrical outer vessel having a first and a second end and a cylindrical, internal volume;
   b.) a plurality of multiple downcomer fractionation trays located in the outer vessel at different points between the first and second ends of the vessel, with each tray comprising:
      (i) at least two narrow, trough-shaped downcomers which are parallel to each other and equidistantly spaced across the tray, each downcomer being formed by two opposing planar side walls and two end walls which are shorter than the side walls, the side walls and end walls oriented perpendicular to the plane of the tray and extending through the lane of the tray to form an inlet weir, each downcomer having an open inlet and a liquid sealable outlet means located above the contacting deck of the next lower tray,
      (ii) a plurality of elongated perforated vapor-liquid contacting decks, with a vapor-liquid contacting deck being located adjacent each downcomer side wall such that the tray has at least one more vapor-liquid contacting deck than downcomer means; and,
      (iii) a substantially imperforate calming plate located between the open inlet of the downcomer and said contacting decks, the calming plates being separated from the contacting decks by a weir which is perpendicular to the contacting deck.

4. The column of claim 3 further characterized in that the downcomers of vertically adjacent trays are aligned and connected by means to define liquid flow paths comprising inclined downcomer baffles located above the open inlet of each downcomer, with a baffle extending from one sidewall of each downcomer to an opposite sidewall of an aligned downcomer of a vertically adjacent tray.

5. The column of claim 4 wherein there are at least three downcomers on each tray and the downcomer baffles are uniformly aligned on each downcomer.

6. The column of claim 4 further characterized in that a means to decrease the velocity of liquid flowing downward over the downcomer baffles is provided on the downcomer baffles.

* * * * *